United States Patent [19]
Knoll et al.

[11] Patent Number: 6,152,066
[45] Date of Patent: *Nov. 28, 2000

[54] DISPLAY INSTRUMENT

[75] Inventors: Peter Knoll, Ettlingen; Ralf Mueller-Sybrichs, Ditzingen; Derk Oreans, Leonberg, all of Germany

[73] Assignee: Moto-Meter GmbH, Leonbert, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/776,913
[22] PCT Filed: Jul. 19, 1995
[86] PCT No.: PCT/DE95/00944
  § 371 Date: Apr. 21, 1997
  § 102(e) Date: Apr. 21, 1997
[87] PCT Pub. No.: WO96/05482
  PCT Pub. Date: Feb. 22, 1996

[30] Foreign Application Priority Data

Aug. 12, 1994 [DE] Germany .............................. 44 28 549
Dec. 14, 1994 [DE] Germany .............................. 44 44 471

[51] Int. Cl.⁷ ............................ G01D 11/28; G01D 13/00
[52] U.S. Cl. ........................................... 116/288; 116/286
[58] Field of Search ................... 116/DIG. 35, DIG. 36, 116/286, 287, 288; 362/23, 26, 84; 40/593

[56] References Cited

U.S. PATENT DOCUMENTS

| | | |
|---|---|---|
| 3,641,967 | 2/1972 | Charbonneaux . |
| 3,930,459 | 1/1976 | Barrow . |
| 4,181,925 | 1/1980 | Burrows et al. ............................ 362/29 |
| 4,559,582 | 12/1985 | Scardilli et al. ........................... 362/23 |
| 4,951,177 | 8/1990 | Nishizaki et al. ......................... 362/28 |
| 5,029,946 | 7/1991 | Kameda .................................... 362/28 |
| 5,272,463 | 12/1993 | Furuya et al. ........................... 340/438 |
| 5,598,382 | 1/1997 | Wilson et al. ........................... 368/226 |

FOREIGN PATENT DOCUMENTS

| | | | |
|---|---|---|---|
| 209314 | 9/1987 | Japan ..................................... | 116/286 |
| 223221 | 8/1992 | Japan ..................................... | 362/23 |
| 719398 | 12/1954 | United Kingdom .................. | 116/286 |
| 719399 | 12/1954 | United Kingdom .................. | 116/286 |

*Primary Examiner*—Hezron Williams
*Assistant Examiner*—Willie Morris Worth
*Attorney, Agent, or Firm*—Kenyon & Kenyon

[57] ABSTRACT

A display instrument with a first display and with an electro-luminescent display arranged at least partially in front of the first display is, where the first display can be illuminated or can be rendered luminous and appears as an almost uniformly dark surface when neither illuminated nor luminous.

18 Claims, 4 Drawing Sheets

DISPLAY INSTRUMENT

FIELD OF THE INVENTION

The present invention relates to a display instrument.

BACKGROUND INFORMATION

There is a known display instrument where two displays are combined visually via a semitransparent mirror on a display surface of the display instrument. This makes it possible to observe either one or both of the displays together on the display surface of the display instrument. However, the display instrument has a relatively great overall depth and also has a relatively high optical attenuation, so the cost of lighting the display instrument is also high. In addition, there is another known display instrument where two liquid crystal displays are arranged in front of a mechanical display instrument where a pointer moves in front of a digital display face. The liquid crystal display facing the observer of the display instrument serves to present information, while the liquid crystal display beneath the former serves as a reversible background for the front liquid crystal display. The rear liquid crystal display can be switched between a dispersing state and a transparent state. However, this display instrument also has a relatively great overall depth and high optical attenuation.

SUMMARY OF THE INVENTION

The display instrument according to the present invention, however, has the advantage that it has an extremely small overall depth, which facilitates installation of the display instrument. In addition, it has a low optical attenuation, so the cost of lighting the display instrument is very low.

Designing the first display as a pointer instrument offers the advantage that a combination of a conventional pointer instrument such as those used in the automotive industry to display speed, for example, with an electro-luminescent display is created here for other information that is more suitable for electro-luminescent display.

Applying the dial plate to a light-conducting supporting body offers the advantage that the dial plate is supported mechanically and the light-conducting supporting body also serves as a light guide for light to illuminate the dial plate.

The overall depth of the display instrument is reduced in an advantageous manner if an indentation into which the pointer projects is provided when the electro-luminescent display is arranged in front of the pointer.

If the electro-luminescent display is attached to the dial plate, this further reduces the total depth of the display instrument. In addition, this provides a mechanically stable mounting for the electro-luminescent display. Furthermore, optical distortion (such as the parallax effect) in reading the display on the dial plate is also reduced.

The design of the pointer as a disk-shaped light-conducting body with a cutout that serves as the pointer in an opaque cover layer leads to the advantage that the pointer can be illuminated especially easily through the disk-shaped light-conducting body. Furthermore, the pointer exerts practically no imbalancing effect on the shaft in its rotational movement on the shaft holding the pointer. In addition, the disk design is especially suitable for achieving a dark appearance when the lighting for the pointer is off.

When the pointer is made of a disk-shaped opaque material with a recess that serves as the pointer, the light of the lighting device provided to illuminate the dial plate can also be used as a lighted pointer at the same time without having to provide any additional light-conducting body for the pointer. Therefore, this reduces the cost. Here again, the pointer has practically no imbalancing effect on the shaft holding the pointer due to its approximately rotationally symmetrical shape.

If a pointer drive mechanism that drives the pointer is mounted on a base plate together with the lighting device, this reduces the cost of mounting as well as the cost of supplying electric power to the pointer drive mechanism and the lighting device. Moreover, the base plate also prevents interfering light from penetrating into the interior of the casing of the display instrument at the same time.

Another advantage is obtained if the first display has an LCD or LED display or some other lighting device because this permits an especially flat design of the display instrument.

If at least one additional electro-luminescent display is provided between the first display and the electro-luminescent display, the display instrument can be designed in several layers with multiple displays, thus permitting a high variability.

If a cover disk is provided in front of the first display and the electro-luminescent display, these displays are protected from environmental influences and unwanted mechanical effects.

If the cover disk is designed as a circular polarizer, the cover disk serves to provide an antiglare effect for the surface of the electro-luminescent display inside the display instrument in an advantageous manner.

A color filter offers the advantage that outside light reaching the interior of the display instrument through the cover disk is attenuated.

If the cover disk is inclined, a black surface in it can be reflected back to the plane of the observer, thus permitting an inexpensive antiglare effect for the surface of the cover disk.

DETAILED DESCRIPTION

Figure 1:
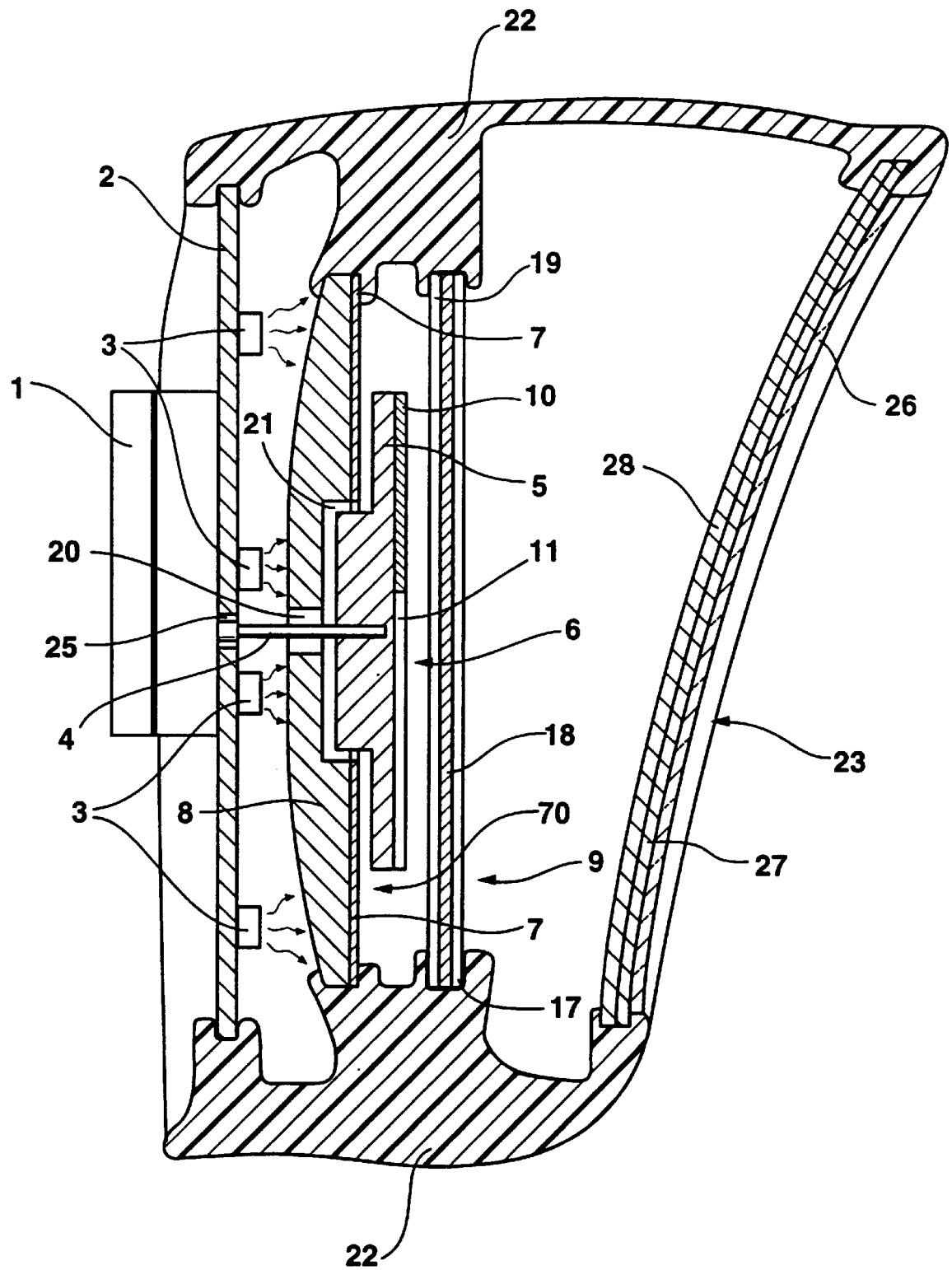
FIG. 1 shows a display instrument with a disk-shaped pointer and cover disk.

FIG. 1 shows a display instrument, in which a painter drive mechanism 1 that drives a shaft 4 to rotate is mounted on a base plate 2, in which shaft 4 passes through a passage 25 in base plate 2. On the side facing away from pointer drive mechanism 1, base plate 2 has several lighting devices 3. Lighting devices 3 illuminate a disk-shaped, approximately plano-convex light-conducting supporting body 8 on which there is mounted a ring-shaped dial plate 7 facing away from lighting devices 3 on its approximately flat side. Shaft 4 passes through a passage 20 in light-conducting supporting body 8. In addition, light-conducting supporting body 8 which is designed with rotational symmetry has a recess 21 in the center of ring-shaped dial plate 7 so that it is concentric with the axis of symmetry of supporting body 8 in which shaft 4 runs. On one end, shaft 4 has a disk-shaped light-conducting body 5 consisting of two individual concentric cylindrical disks with different diameters. The individual disk of disk-shaped light-conducting body 5 having the smaller diameter faces base plate 2 with a flat base face. On the opposite side, disk-shaped light-conducting body 5 has an opaque cover layer 10 with a radial cutout 11 on the flat base face of the single disk having the larger diameter. Cutout 11 is designed as a slot running radially in cover layer 10. Disk-shaped light-conducting body 5 together with cover layer 10 and its cutout 11 forms a pointer 6. An electro-luminescent display 9 is provided in front of pointer 6 and has a structured transparent layer that is designed as front electrode 17, another structured transparent layer that serves as rear electrode 19 and an electro-luminescent layer 18 provided between the two electrodes 17 and 19. Base plate 2, light-conducting supporting body 8 and electro-luminescent display 9 are bound together in a casing 22 that has a transparent cover disk 23 in front of electro-luminescent display 9. Cover disk 23 includes a λ/4 layer 28 on the side facing the interior of the casing and a color filter 26 on the outside of the display instrument as well as a linear polarizer 27 mounted between color filter 26 and λ/4 layer 28.

Pointer 6 and dial plate 7 together form a first display 70.

Pointer drive mechanism 1 drives pointer 6 to rotate. Pointer 6 projects into recess 21 with the individual disc having the smaller diameter of the disk-shaped light-conducting body 5. This reduces the overall depth of the display instrument while at the same time maintaining the stability of the pointer. Lighting devices 3 illuminate the light-conducting supporting body 8 from the rear. Light enters the light-conducting supporting body 8 and then goes to the back of the ring-shaped dial plate 7. Thus, the light illuminates dial plate 7 from the rear. In addition, the light goes from light-conducting supporting body 8 through recess 21 into disk-shaped light-conducting body 5 of pointer 6. The light entering there is conducted only through cutout 11 in the direction of electro-luminescent display 9 and through electro-luminescent display 9 and cover disk 23 to the plane of the observer. Cutout 11 thus appears illuminated and therefore serves as pointer 6, giving the appearance of a lance-shaped pointer of the conventional type. When lighting devices 3 are turned on, dial plate 7 and pointer 6 or the first display 70 are lighted from the rear. In this case electro-luminescent display 9 is turned off. Electro-luminescent display 9 is almost transparent when turned off. Thus, an observer in the observer plane observing the display instrument through cover disk 23 can see the lighted first display 70 through electro-luminescent display 9 and can read the information displayed there.

If lighting devices 3 are turned off, however, no light goes from them to light-conducting supporting body 8 and therefore none goes to disk-shaped light-conducting body 5. Dial plate 7 and pointer 6 are designed to appear as an almost uniformly dark surface when observed from the front without lighting. Suitable materials for dial plate 7 and cover layer 10 include films (such as Macrofol films) with a "dead front" appearance. Electro-luminescent display 9, whose electric connections are not shown here for the sake of simplicity and whose activation principle is essentially known, is used to display additional information that can be observed and read through cover disk 23 by the observer. Usually in displaying such additional information by means of electro-luminescent display 9 it is desirable for the background to appear dark so the additional information displayed can be read with no problem. This requirement is met here due to the fact that dial plate 7 and pointer 6 appear as an almost uniform dark surface when the lighting is turned off. Thus, the information can optionally be displayed by means of dial plate 7 and pointer 6 or by displaying additional information on electro-luminescent display 9. However, if the observer desires, both displays can appear simultaneously by lighting electro-luminescent display 9 as well as pointer 6 and dial plate 7, so a combination of displayed information on just one display surface is possible. In an advantageous embodiment according to the present invention, electro-luminescent display 9 may be designed by the ACTFELD (alternating-current thin-film electro-luminescent display) principle. This is an especially thin design of electro-luminescent display 9. This yields a high transmittance when electro-luminescent display 9 is turned off. In addition, the total depth of the display instrument is reduced.

Cover disk 23 is designed as a circular polarizer. By linear polarization using linear polarizer 27 and by a 90° rotation of the plane of polarization through λ/4 layer 28, light passing through cover disk 23 and reaching the interior of the display instrument and then striking cover disk 23 from the inside after being reflected on front electrode 17 of electro-luminescent display 9 is prevented from escaping from the interior of the display instrument, which thus provides a glare suppression effect for electro-luminescent display 9. Color filter 26 preferably has a narrow band pass range around the wavelength of the light of electro-luminescent display 9, which is about 585 nm (yellow) for a known thin-film electro-luminescent display. This yields the effect that any light of a different color reaching the interior of the display instrument through cover disk 23 from the outside is greatly attenuated, so there is not any unwanted brightening of the interior of the display instrument and thus the display contrast is increased. By inclining cover disk 23 toward a black surface, the latter is reflected for the observer in cover disk 23. This yields with simple means an antiglare effect of cover disk 23 which could otherwise be achieved only by coating with expensive antiglare layers. Since this display instrument is used preferably in combination automotive instruments, e.g., in passenger automobiles, it is possible for the cover disk to be inclined toward the dashboard for this purpose, because the latter is usually black.

Figure 2:
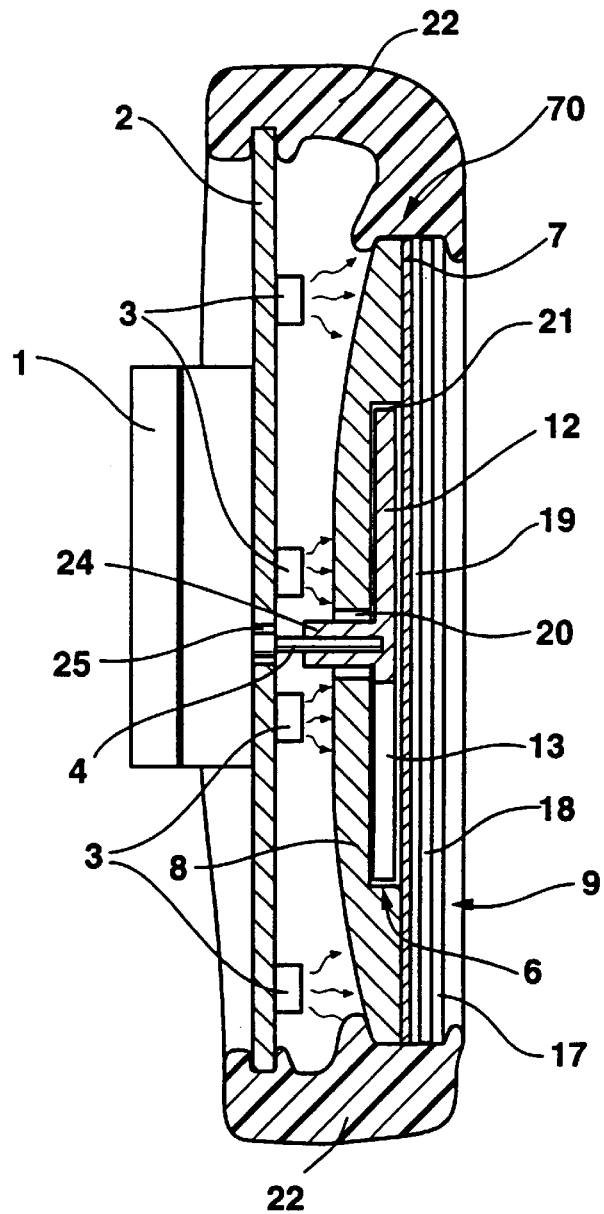
FIG. 2 shows a display instrument with a disk-shaped pointer and an electro-luminescent display mounted directly on the dial plate.

FIG. 2 shows another embodiment of a display instrument according to the present invention. The numbering of the individual parts in FIG. 1 has been retained here. Pointer drive mechanism 1 is in turn attached to the back of base plate 2 so that shaft 4, which is driven by pointer drive mechanism 1, passes through passage 25 in base plate 2. Several lighting devices 3 that light up light-conducting supporting body 8 are again provided on base plate 2. Light-conducting supporting body 8 is again designed with rotational symmetry and has cylindrical passage 20, through which shaft 4 passes, arranged concentrically with its axis of symmetry in which shaft 4 also lies. An opaque disk-shaped body 12 having the same shape as disk-shaped light-conducting body 5 shown in FIG. 1 has a pointer hub 24 as the individual disk with a smaller diameter into which shaft 4 is inserted. Opaque disk-shaped body 12 also has a slot-shaped cutout 13 running radially. Opaque disk-shaped body 12 together with slotted cutout 13 forms an approximately rotationally symmetrical pointer 6. Light-conducting supporting body 8 has a recess 21 containing the individual disk of pointer 6 having the larger diameter, in which diameter is smaller than the diameter of recess 21, and pointer hub 24 whose diameter is smaller than the diameter of passage 20 passes through passage 20. The flat surface of light-conducting supporting body 8 that faces the observer projects beyond the flat surface of opaque disk-shaped body 12 facing the observer. Circular dial plate 7, which forms a cover for recess 21, is applied to the surface of light-conducting supporting body 8. Electro-luminescent display 9 is mounted directly on the top of dial plate 7. Electro-luminescent display 9 includes rear electrode 19, front electrode 17 and the electro-luminescent layer 18 applied between the two electrodes 17 and 19. Electro-luminescent display 9 together with dial plate 7 and light-conducting supporting body 8 thus forms a fixed, approximately plano-convex unit. This unit is mounted in casing 22 together with base plate 2. Pointer 6 and dial plate 7 form the first display 70.

Here again, lighting devices 3 serve to provide light for the light-conducting supporting body 8 which conducts the incoming light to dial plate 7. The slotted cutout 23 in opaque disk-shaped body 12 serves to transmit light coming out of the light-conducting supporting body 8 in the direction of the observer and thus gives the appearance of an illuminated pointer 6. Here again, as in the arrangement illustrated in FIG. 1, even when electro-luminescent display 9 is turned off, direct observation of the first display 70 and the information displayed on it is possible through electro-luminescent display 9, which appears transparent in this case. Lighting devices 3 are switched on for this purpose. In the converse case, lighting devices 3 are switched off and dial plate 7 and pointer 6 appear as an almost uniformly dark background surface for displaying the additional information on electro-luminescent display 9. This is accomplished in the known way by controlling electrodes 17, 19. Here again, it is especially expedient to design electro-luminescent display 9 as an ACTFELD because this permits an especially small overall depth of the display instrument. Due to the fact that pointer 6 is embedded completely in the contour of light-conducting supporting body 8, this yields a further reduction in overall depth and an improvement in accuracy in reading the display instrument.

Figure 3:
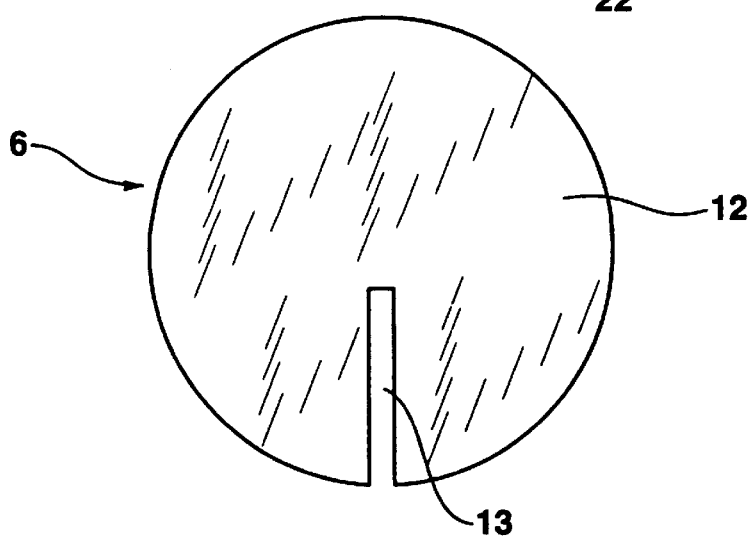
FIG. 3 shows a top view of a disk-shaped pointer.

FIG. 3 shows a top view of pointer 6. It can be seen here that pointer 6 is designed with approximate rotational symmetry, where the symmetry is interrupted only by the slotted cutout 13 running radially to the outside edge in opaque disk-shaped body 12. Due to the approximately rotational symmetry of shape, pointer 6 exerts only an extremely slight bending moment on shaft 4 during acceleration by shaft 4 in driving pointer 6, which thus improves the accuracy in display and also lengthens the lifetime of the display instrument. In addition, the required "dead front" appearance can be achieved especially well because pointer 6 has a large surface which, when mounted on the supporting body, forms only a small ring-shaped slot between the supporting body 8 and pointer 6, which could cause an inhomogeneity in appearance.

Figure 4:
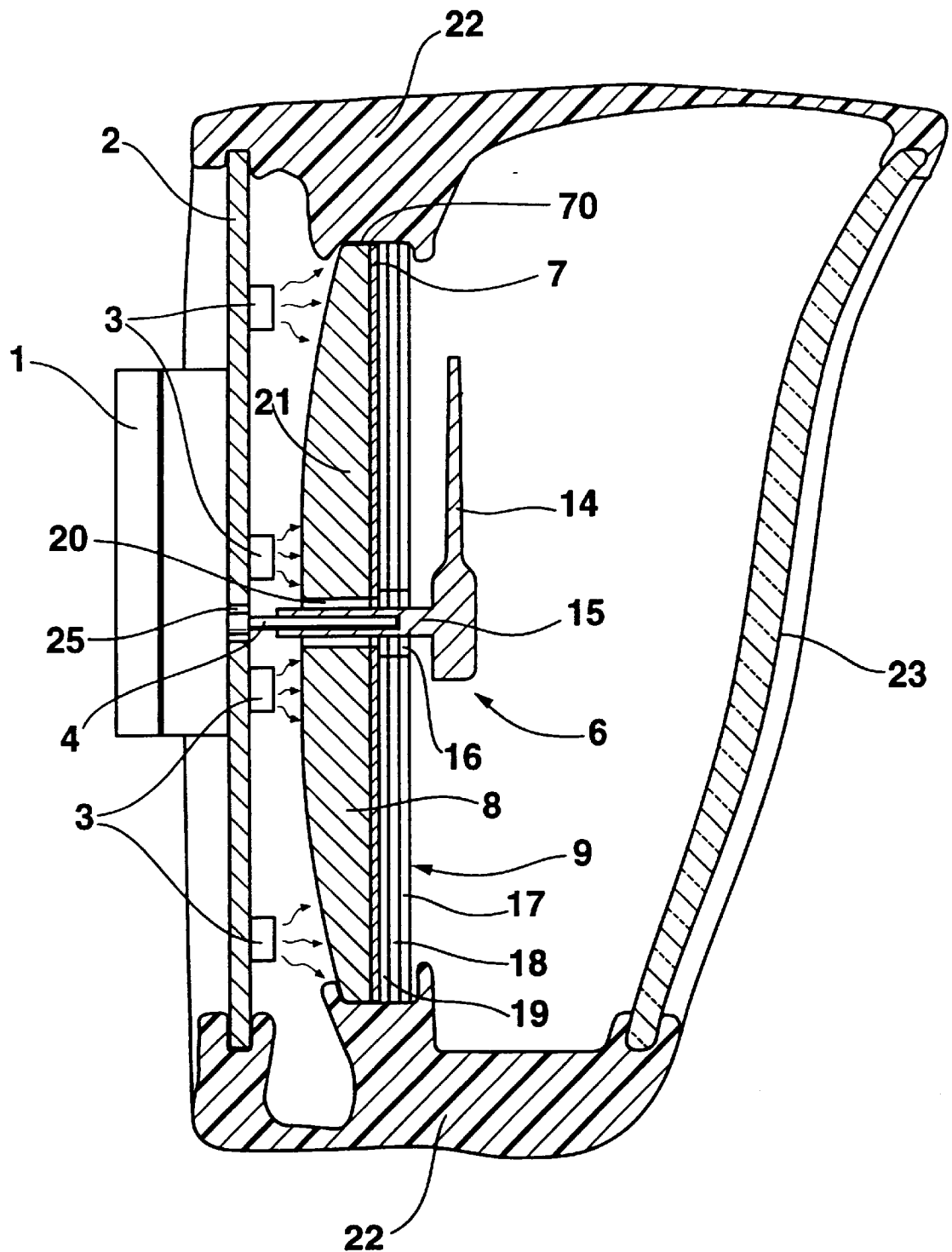
FIG. 4 shows a display instrument with a movable pointer in front of the electro-luminescent display.

FIG. 4 shows a third embodiment of the display instrument. Here again, the numbering of the individual elements according to FIGS. 1 and 2 has been retained. Pointer drive mechanism 1 is mounted on the back of base plate 2, where shaft 4 that is driven to rotate by pointer drive mechanism 1 passes through passage 25 in base plate 2. A plurality of lighting devices 3 that illuminate light-conducting supporting body 8, which has an approximately plano-convex shape, are arranged on the side of base plate 2 facing away from pointer drive mechanism 1. Dial plate 7 is applied to light-conducting supporting body 8 on the side facing away from lighting devices 3. Dial plate 7 and supporting body 8 have a cylindrical passage 20 through which shaft 4 projects. Pointer 6 which has a pointer vane 14 and a light-conducting hub 15 is mounted on shaft 4 at light-conducting hub 15. Light-conducting hub 15 also passes through a cylindrical hole 16 provided in electro-luminescent display 9. Electro-luminescent display 9 consists of three layers, with electro-luminescent layer 18 provided between front electrode 17 and back electrode 19. Electro-luminescent display 9 is applied to the entire area of dial plate 7. In addition, cover disk 23 is placed in front of electro-luminescent display 9 and pointer 6 which are housed in a casing 22 as are base plate 2 and electro-luminescent display 9, which is connected to dial plate 7 and light-conducting supporting body 8. Here again, pointer 6 and dial plate 7 form the first display 70.

This is a design of the display according to the present invention instrument wherein pointer 6, which is not designed with rotational symmetry, is mounted so it can move. Light emitted by lighting devices 3 lights up the light-conducting supporting body 8 as well as light-conducting hub 15 from the rear. The light entering through light-conducting hub 15 is conducted into pointer vane 14, thus illuminating it. Likewise, dial plate 7 is illuminated from the rear by light entering the light-conducting supporting body 8. Thus when lighting devices 3 are turned on, luminous pointer 6 in front of luminous dial plate 7 can be seen through cover disk 23 when electro-luminescent display 9 is off and is thus transparent. When lighting devices 3 are turned off, dial plate 7 appears as an approximately dark background for electro-luminescent display 9. Since pointer 6 is made of a light-conducting but otherwise almost transparent material, it causes only negligible interference with display of additional information by electro-luminescent display 9 when lighting devices 3 are turned off. Since electro-luminescent display 9 is mounted directly on dial plate 7, this reduces the overall depth and also there is practically no optical distortion even when observed at an oblique angle. Furthermore, the parallax error is minimal in the case of simultaneous display of information by means of dial plate 7 and additional information on electro-luminescent display 9. Here again, it is expedient to design electro-luminescent display 9 as an ACTFELD. Likewise, cover disk 23 is again designed as a circular polarizer arranged in an inclined position with a color filter 26.

Figure 5:
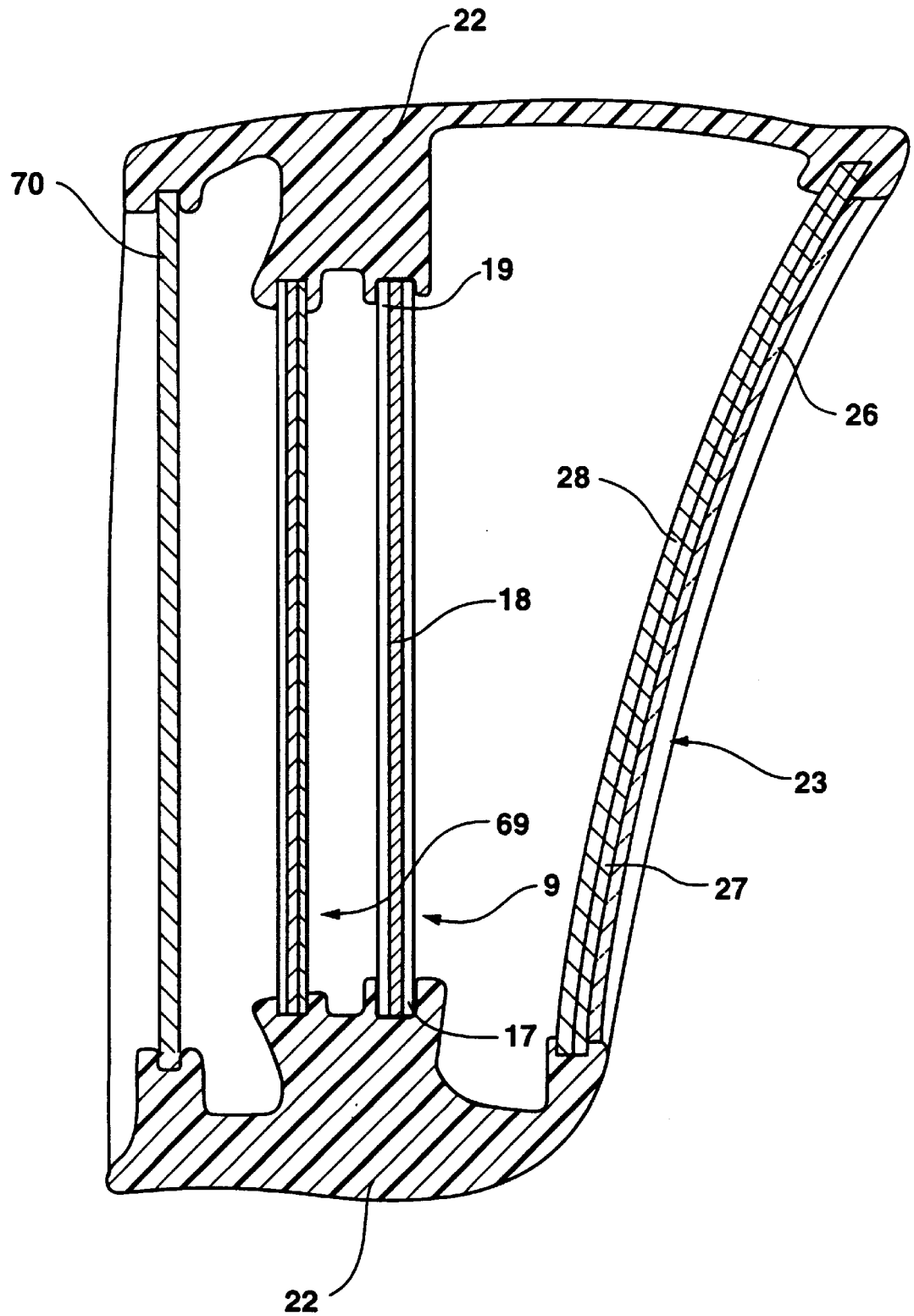
FIG. 5 shows a display instrument with an LED display and two electro-luminescent displays mounted one above the other.

As another embodiment of the display instrument according to the present, FIG. 5 shows an arrangement that differs from the arrangement illustrated in FIG. 1 in the following points. Two electro-luminescent displays 9, 69 are arranged in front of the first display 70 in casing 22, where the first display 70 is designed as an LED display. This eliminates lighting devices 3, base plate 2, supporting body 8, pointer 6, dial plate 7 and pointer drive mechanism 1.

Thus, this display instrument is suitable for presenting different information on one of displays 70, 9, 69 by switching between the three displays 70, 9, 69. To do so, only one of the three displays 70, 9, 69 is turned on while the two other displays 70, 9, 69 remain off. Since electro-luminescent displays 9, 69 appear transparent when they are not activated, an unhindered view of whichever display 9, 69, 70 is in use at the moment is possible. Conversely, LED display 70 forms a dark background if one of the two electro-luminescent displays 9, 69 is used to display information.

As another embodiment of the display instrument according to the present invention, a series arrangement of several electro-luminescent displays 9, 69 is also disclosed, with the first display 70 arranged at least partially behind them, so it is occasionally illuminated and is thus visible but it can also be switched alternatively to be illuminated and dark. Such a series arrangement can be used to display information in three-dimensional form by operating electro-luminescent displays 9, 69 and possibly also the first display 70 at the same time. As already indicated, the first display 70 need not necessarily include a pointer instrument. It may also include an LCD or LED display or luminous devices of any type that meet the requirement of forming a dark background for electro-luminescent display 9 in a condition where no information is displayed.

Cover disk 23 can also be designed as a normal transparent disk.

What is claimed is:

1. A display instrument, comprising:

a casing;

a first display arranged in the casing for providing information to an outside observer in a first plane of observations;

an arrangement including at least one lighting device for producing a substantially uniform dark surface on the first display during a first state of the first display corresponding to an off state and for producing one of an illuminated state and a luminous state on the first display during a second state of the first display; and a second display arranged in the casing at least partially in front of the first display, the second display providing a multiplicity of additional information to the outside observer in a second plane of observation covering an area that is substantially the same as an area covered by the first plane of observation and that substantially overlaps the first plane of observation, wherein the second display includes an electro-luminescent display, and wherein the second display includes an arrangement for producing a transparent state for the second display during an off state of the second display.

2. A display instrument, comprising:

a casing;

a first display arranged in the casing for providing information to an outside observer in a first plane of observation;

an arrangement including at least one lighting device for producing a substantially uniform dark surface on the first display during a first state of the first display corresponding to an off state and for producing one of an illuminated state and a luminous state on the first display during a second state of the first display; and a second display arranged in the casing at least partially in front of the first display, the second display providing a multiplicity of additional information to the outside observer in a second plane of observation covering an area that is substantially the same as an area covered by the first plane of observation and that substantially overlaps the first plane of observation, wherein the second display includes an electro-luminescent display, wherein the second display includes an arrangement for producing a transparent state for the second display during an off state of the second display, wherein the first display includes a dial plate and a moveable pointer arranged in front of the dial plate, the second display being arranged at least in front of the dial plate, and wherein the at least one lighting device is disposed adjacent to the first display in the casing, the at least one lighting device including an arrangement for producing the second state in the first display by lighting the moveable pointer and the dial plate.

3. A display instrument, comprising:

a casing;

a first display arranged in the casing for providing information to an outside observer in a first plane of observation;

an arrangement including at least one lighting device for producing a substantially uniform dark surface on the first display during a first state of the first display corresponding to an off state and for producing one of an illuminated state and a luminous state on the first display during a second state of the first display;

a second display arranged in the casing at least partially in front of the first display, the second display providing a multiplicity of additional information to the outside observer in a second plane of observation covering an area that is substantially the same as an area covered by the first plane of observation and that substantially overlaps the first plane of observation, wherein the second display includes an electro-luminescent display; and a cover plate disposed in front of the first display and second display, wherein the cover plate is designed as a circular polarizer.

4. A display instrument, comprising:

a casing;

a first display arranged in the casing for providing information to an outside observer in a first plane of observation;

an arrangement including at least one lighting device for producing a substantially uniform dark surface on the first display during a first state of the first display corresponding to an off state and for producing one of an illuminated state and a luminous state on the first display during a second state of the first display;

a second display arranged in the casing at least partially in front of the first display, the second display providing a multiplicity of additional information to the outside observer in a second plane of observation covering an area that is substantially the same as an area covered by the first plane of observation and that substantially overlaps the first plane of observation, wherein the second display includes an electro-luminescent display; and a cover plate disposed in front of the first display and second display, wherein the cover plate includes a color filter, the color filter transmitting light having a wavelength substantially in a range of a wavelength of light transmitted by the second display.

5. A display instrument, comprising:

a casing;

a first display arranged in the casing;

an arrangement including at least one lighting device for producing a substantially uniform dark surface on the first display during a first state of the first display corresponding to an off state and for producing one of an illuminated state and a luminous state on the first display during a second state of the first display; and a second display arranged in the casing at least partially in front of the first display, wherein the second display includes an electro-luminescent display, and wherein the second display includes an arrangement for producing a transparent state for the second display during an off state of the second display.

6. A display instrument, comprising:

a casing;

a first display arranged in the casing for providing information to an outside observer in a first plane of observation;

an arrangement including at least one lighting device for producing a substantially uniform dark surface on the first display during a first state of the first display corresponding to an off state and for producing one of an illuminated state and a luminous state on the first display during a second state of the first display;

a second display arranged in the casing at least partially in front of the first display, the second display providing a multiplicity of additional information to the outside observer in a second plane of observation covering an area that is substantially the same as an area covered by the first plane of observation and that substantially overlaps the first plane of observation, wherein the second display includes an electro-luminescent display; and a cover plate disposed in front of the first display and second display, wherein the cover plate is designed as a circular polarizer, and wherein the cover plate includes a λ/4 layer to produce a 90° rotation in a plane of polarization of the cover plate.

7. A display instrument, comprising:

a casing;

a first display arranged in the casing for providing information to an outside observer in a first plane of observation, the first display including:

an arrangement including at least one lighting device for producing a substantially uniform dark surface on the first display during a first state of the first display corresponding to an off state and for producing one of an illuminated state and a luminous state on the first display during a second state of the first display; and a second display arranged in the casing at least partially in front of the first display, the second display providing a multiplicity of additional information to the outside observer in a second plane of observation that substantially overlaps the first plane of observation, wherein the second display includes an electro-luminescent display that includes:

a front electrode, a rear electrode, and an electro-luminescent layer arranged between the front electrode and the rear electrode, wherein:

the providing of the multiplicity of additional information is caused by a triggering of the front electrode and the rear electrode, and the second display includes an arrangement for producing a transparent state for the second display during an off state of the second display.

8. The display instrument according to claim 2, wherein the dial plate is mounted on a light conducting supporting body.

9. The display instrument according to claim 8, wherein the supporting body includes a recess at least partially receiving the pointer, and the second display is arranged in front of the pointer.

10. The display instrument according to claim 2, wherein the second display is mounted on the dial plate.

11. The display instrument according to claim 2, wherein the pointer is formed by a disc-shaped light-conducting body having a front side, the front side being covered by a substantially opaque cover layer, the cover layer including a cut-out that functions as the pointer.

12. The display instrument according to claim 2, wherein the pointer is formed by a disc-shaped, substantially opaque body having a cutout, the cutout functioning as the pointer.

13. The display instrument according to claim 2, wherein the pointer is rotatably mounted on a shaft which extends from a pointer drive mechanism, the pointer drive mechanism mounted on a base plate together with the at least one lighting device.

14. The display instrument according to claim 1, wherein the first display includes one of an LCD display, a lighting element and an LED display.

15. The display instrument according to claim 1, further comprising a third display arranged between the first display and the second display, wherein the third display includes an electro-luminescent display.

16. The display instrument according to claim 1, further comprising a cover plate disposed in front of the first display and second display.

17. The display instrument according to claim 16, wherein the cover plate is inclined with respect to at least the first plane of observation of the first display to produce an antiglare effect in at least the first plane of observation.

18. The display instrument according to claim 1 wherein, when the first display is in the second state, the first display provides the information to the outside observer through an area at least substantially covered by the second plane of observation.

* * * * *

UNITED STATES PATENT AND TRADEMARK OFFICE
CERTIFICATE OF CORRECTION

PATENT NO. : 6,152,066
DATED : November 28, 2000
INVENTOR(S) : Knoll et al.

It is certified that error appears in the above-identified patent and that said Letters Patent is hereby corrected as shown below:

<u>Abstract,</u>
Line 3, delete "... is ...".

<u>Column 2,</u>
Line 55, change "...painter... to -- pointer --.

<u>Column 6,</u>
Line 16, change "...display according..." to -- display instrument according --.
Line 17, delete "...instrument...".
Line 46, change "...present." to -- present invention. --.

<u>Column 7,</u>
Line 19, change "...observations;..." to -- observation.

Signed and Sealed this

Eleventh Day of September, 2001

Attest:

NICHOLAS P. GODICI
*Attesting Officer*    *Acting Director of the United States Patent and Trademark Office*